United States Patent [19]

Dodd et al.

[11] Patent Number: 5,997,230
[45] Date of Patent: Dec. 7, 1999

[54] PLASTIC NON-CONDUCTIVE EXPLOSIVE BOLT

[75] Inventors: Ralph P. Dodd, Hackensack; Michael Van Kooten, Vernon; Edward SooHoo, Stanhope, all of N.J.

[73] Assignee: Cartridge Actuated Devices, Inc., Fairfield, N.J.

[21] Appl. No.: 08/820,327

[22] Filed: Mar. 12, 1997

[51] Int. Cl.$^6$ ............................ F16B 35/00; F16B 35/02
[52] U.S. Cl. ............................ 411/383; 411/20; 411/395; 411/908
[58] Field of Search ............................ 411/2–5, 19, 20, 411/383, 395, 424, 901, 902, 908

[56] References Cited

U.S. PATENT DOCUMENTS 2,410,047  10/1946  Burrows et al. ..................... 411/20 X
3,386,138  6/1968  Overman ..................... 411/383
5,098,240  3/1992  Gapp et al. ..................... 411/908 X
5,196,673  3/1993  Tanis ..................... 411/395 X
5,402,728  4/1995  Garner ..................... 411/19 X

*Primary Examiner*—Neill Wilson
*Attorney, Agent, or Firm*—Nolte, Nolte & Hunter

[57] ABSTRACT

An explosive bolt is made of electrically non-conductive plastic material and is provided with a bore accommodating a low order deflagrating squid having only sufficient explosive energy to shatter a non-metallic bolt insulation surrounds the squib and fills the center bore and seals the squib in the center bore. There is a detonator for detonating the squib. Detonation of the squib is initiated by electrical current from an outside source electrically connected to the squib. A device has a stationary part and a removable part connected by the bolt.

4 Claims, 1 Drawing Sheet

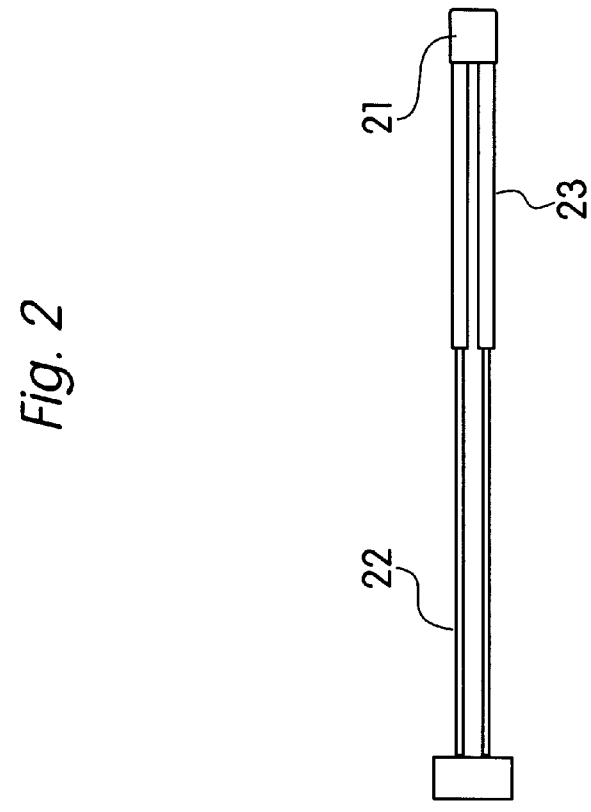
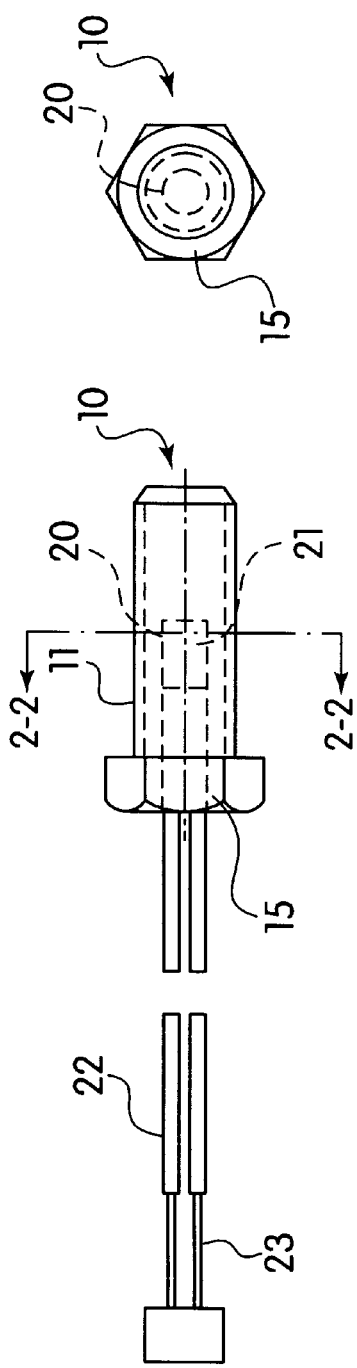
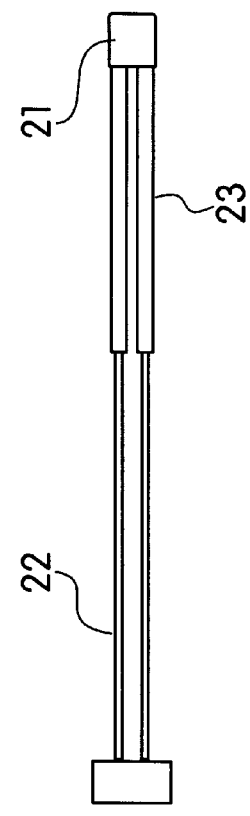
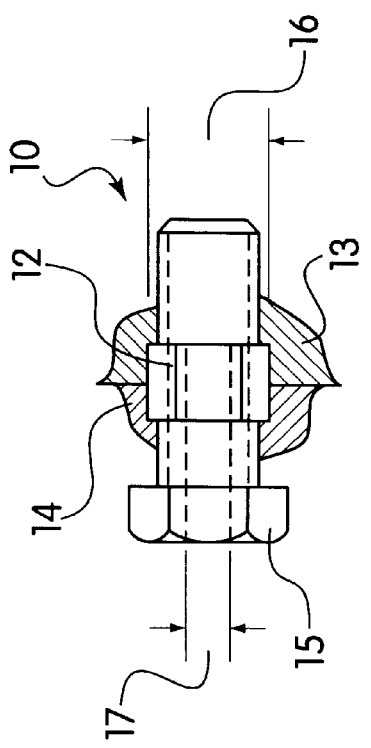

PLASTIC NON-CONDUCTIVE EXPLOSIVE BOLT

CROSS-REFERENCES TO RELATED APPLICATIONS

This application takes priority of provisional application filed Mar. 12, 1997 under 35 U.S.C. 119(e) and 37 CFR 1.53 (b) (2) SR No. 60/013,181.

BACKGROUND OF THE INVENTION

The invention relates to electrically initiated explosive devices, particularly explosive bolts and to such bolts which may be used underwater as hinge connectors or simple fasteners but which are expendable when access past the hinged or bolted work piece is required.

The invention is concerned with explosive bolts which shatter when exploded to provide access through openings such as doorways or hatches otherwise bolted closed by the unexploded bolt. More particularly, the invention pertains to such bolts which can better be used in marine environments.

DESCRIPTION OF THE RELATED ART INCLUDING INFORMATION DISCLOSED UNDER 37 CFR 1.97 AND 1.98

An explosive bolt of the prior art is metal and is drilled from the top of its hex head along the axis of the bolt to accommodate a cup loaded with a relatively high order explosive which is detonated by electrical initiation of a primer. The explosion detonation shatters the bolt. The cartridge used in detonating metal bolts is metal and produces High order detonation which fractures the bolt.

In another prior art construction explosive pressure drives a ram to the end of the bolt which is shorn off by the impact. The cartridge used in these conventional bolts is, as in the bolts that are shattered, metallic cased and contains several pyrotechnic/explosive components. The propellant produces high pressures which drive the ram or piston to shatter the end of the bolt.

BRIEF SUMMARY OF THE INVENTION

The present invention is directed to a plastic bolt which has been provided with a bore to accommodate a low order squib deflagration, the ignition composition of which is ignited by electrical activation of an initiator enclosed in the same cup as the initiation composition.

The squib used in the plastic bolt is made entirely from plastic, PVC, glass, etc., except for the explosive mix and the initiation wires which are made of metal. The space in the bore around the metal (copper) wires, which terminate externally in a source of electrical power, is filled with epoxy.

With a non-metallic squib, the entire bolt, less the wires, is non-conductive, and not readily detectable by metal detectors or x-ray. The squib may, however, be supplied in a metal cup if desirable for a particular application intended.

The squib is a low order deflagrating high brisance energy source electrically initiated, in the preferred embodiment of the invention, and sufficiently destructive to shatter a bolt made of plastic. The plastic bolt is most desirable for use in marine environments to avoid rust and to provide a non conductive fastener to avoid unwanted electric currents.

The plastic bolt of the invention can be made with a percussion initiator, instead of with an electrically initiated explosive, in which case there is no metal in the bolt.

BRIEF DESCRIPTION OF THE SEVERAL VIEWS OF THE DRAWINGS

FIG. 1 is a side elevational view of an explosive bolt according to the invention;

FIG. 2 is and end view of the bottom of the explosive bolt of FIG. 1 taken along the line 2—2 of FIG. 1.

FIG. 3 is a side elevational view of the bolt of FIGS. 1 and 2 in place, connecting the removable and stationary sections of an access area such as a hatch or doorway to a submersible observation station; and FIG. 4 is an elevational view of a low order squib used in the explosive bolt of FIGS. 1–3.

DETAILED DESCRIPTION OF THE INVENTION

In the drawings, the bolt 10 is fabricated, by molding or otherwise, of a non conductive plastic, PVC, glass etc. The bolt is threaded as at 11 along the axial length of its cylindrical outer surface and has a hexagonal head 15 for rotational placement, via a wrench, not shown, within, and in this instance, through a nut 12 internally counter tapped to accept the thread of the bolt.

The mounting of the bolt shown in FIG. 3 is specific to certain types of installations in which a stationary section or part 13 is joined to a removable part 14 of a device by the bolt which is threaded through aligned tapped holes in the parts such an arrangement is particularly suited to a submersible device 13, 14 such as an underwater observation station, where the station is the stationary part 13 having an inside 16 and an outside 17 of the submersible device, and removable part 14 is the hatch. Nut 12 is fitted in the juxtaposed sides of the parts and acts to tighten the hex head against the outer surface of the removable part 14 while the threads of the bottom end of the bolt draw the stationary part to and around the nut. In other types of installations, the nut may reside on the inner side if the stationary part to coact with the hex head to draw the parts tightly together.

The bolt is fabricated with a center bore 20 to receive a low order deflagrating high brisance squib 21 which is detonated by insulated initiaion wires 22 and 23 carrying current from a source of electricity, not shown. The cavity surrounding the insulated wires if filled with epoxy to stabilize and insulate the squib.

In the embodiment of the invention shown, the placement of the squib coincides with the plane of separation of the parts 13 and 14 so that when the bolt shatters, there will be no threading 11 to hold the two parts together. The nut 12 positioned in the separation area surrounding the plane of the squib's position assures centration of released energy from detonation in that area.

What is claimed is:

1. An explosive bolt comprising a cylindrical body threaded along the axial length of its cylindrical outer surface, said cylindrical body being fabricated of electrically non-conductive material and having a center bore, a low order deflagrating squib disposed in said center bore and having only sufficient explosive energy to shatter said bolt, means surrounding said squib and filling said center bore for insulating and sealing said squib in said center bore and means for detonating said squib.

2. The explosive bolt of claim 1 wherein said bolt is fabricated of a non-conductive plastic and detonation of said squib is initiated by electrical current from an outside source and means are provided for electrically connecting said squib to said source.

3. The explosive bolt of claim 2 in combination with access means to the inside of a submersible device and wherein said access means comprises a stationary part and a removable part of said device and said bolt connects said parts.

4. The explosive bolt of claim 1 in combination with access means to the inside of a submersible device and wherein said access means comprises a stationary part and a removable part of said device and said bolt connects said parts.

* * * * *